(12) United States Patent
Bacon

(10) Patent No.: US 6,622,253 B2
(45) Date of Patent: Sep. 16, 2003

(54) CONTROLLING PROCESSOR CLOCK RATE BASED ON THREAD PRIORITY

(75) Inventor: Kinney C. Bacon, Lawrenceville, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 229 days.

(21) Appl. No.: 09/920,692

(22) Filed: Aug. 2, 2001

(65) Prior Publication Data

US 2003/0028816 A1 Feb. 6, 2003

(51) Int. Cl.$^7$ .................................................. G06F 1/32
(52) U.S. Cl. ........................................ 713/322; 713/501
(58) Field of Search ................................. 713/320, 322, 713/500, 501, 600, 601

(56) References Cited

U.S. PATENT DOCUMENTS

| | | | |
|---|---|---|---|
| 5,218,704 A | 6/1993 | Watts, Jr. et al. ............ | 395/750 |
| 5,930,516 A | 7/1999 | Watts, Jr. et al. ....... | 395/750.04 |
| 6,341,347 B1 * | 1/2002 | Joy et al. .................... | 712/228 |
| 6,427,211 B2 | 7/2002 | Watts, Jr. .................... | 713/320 |
| 2002/0083353 A1 | 6/2002 | Orenstein et al. ........... | 713/320 |

* cited by examiner

Primary Examiner—Thomas M. Heckler
(74) Attorney, Agent, or Firm—Kenneth M. Massaroni; Hubert J. Barnhardt, III; Shelley L. Couturier

(57) ABSTRACT

The preferred embodiment of the present invention varies the speed of processor execution, including associating a clock rate with each thread in a plurality of threads and executing each thread in the plurality of threads on the processor at the clock rate associated with the thread.

13 Claims, 5 Drawing Sheets

US 6,622,253 B2

CONTROLLING PROCESSOR CLOCK RATE BASED ON THREAD PRIORITY

FIELD OF THE INVENTION

The present invention generally relates to processor control, and more specifically, to control of processor clock rate.

BACKGROUND OF THE INVENTION

Many systems which utilize a microprocessor have two competing requirements: power consumption and processing power. The power requirements of a CMOS microprocessor are based on the frequency at which the digital circuits are switching. The current requirement is an approximately $$I_{Total} = (n_g \times I_q) + (f \times n_{int} \times I_{int}) + (f \times n_{ext} \times I_{ext})$$

linear function, summarized by
where $I_q$ is the quiescent current of each gate, $n_g$ is the total number of gates, $f$ is the frequency, $n_{int}$ is the average number of internal gates which are switching, $I_{int}$ is the current required to switch an internal gate, $n_{ext}$ is the average number of external pads which are switching and $I_{ext}$ is the current required to switch an external pad.

Typically, $I_q$ tends to be very small in relation to $I_{int}$ and $I_{ext}$. Therefore, by adjusting the frequency of switching f, the amount of current required by the circuit can be controlled. Since power is equal to current multiplied by voltage, and voltage is a fixed value, the power will be modified accordingly.

A system designer attempting to reduce the processor's power requirement by using a lower processor clock rate typically runs into a problem: a processor with a lower clock rate does not have enough MIPs (million instructions per second) to meet the system's processing requirements. Because each instruction takes a specific number of clock cycles to execute, reducing the clock rate increases the time it takes to execute the same number of instructions. Below a minimum clock rate threshold, the system does not have enough time to carry out its required tasks, for example, updating graphics on a screen or buffering incoming data. A second problem with using a reduced clock rate is the increased time required for the processor to handle an interrupt from an I/O device. On some devices, interrupts must be handled quickly, so that reducing the clock rate fails this requirement.

One approach used in prior systems to solve this problem was to use a clock rate high enough to meet system processing requirements, while reducing power consumption by occasionally putting the processor into a low-power state, in which the processor does not execute instructions. One version of this approach relies on a hardware timer that, after some period of inactivity, expires and puts the processor into a low-power state. However, power consumption is still not optimal because the processor runs at its maximum clock rate whenever it executes instructions. Another variation on this approach puts the processor into a low-power state whenever the operating system is in an idle state (no actively running tasks). This approach is also non-optimal because the processor runs at its maximum clock rate whenever it is actively running a task.

Thus, there is a need for a microprocessor-based system that addresses, among others, the above-noted problems of power consumption and processing requirements.

SUMMARY OF THE INVENTION

To achieve various objects and advantages, the preferred embodiment of the present invention is directed to an apparatus and method to control processor clock rates. A microprocessor-based system is partitioned into threads. The preferred embodiment of the present invention takes advantage of differences in thread processing requirements by running some threads at a high processor clock rate and other threads at a lower processor clock rate.

Other objects, features, and advantages of the present invention will become apparent to one skilled in the art upon examination of the following drawings and detailed description. It is intended that all such additional objects, features, and advantages be included herein within the scope of the present invention, as defined by the claims.

BRIEF DESCRIPTION OF THE DRAWINGS

The present invention will be more fully understood from the detailed description given below and from the accompanying drawings of a preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION OF THE INVENTION

Figure 1:
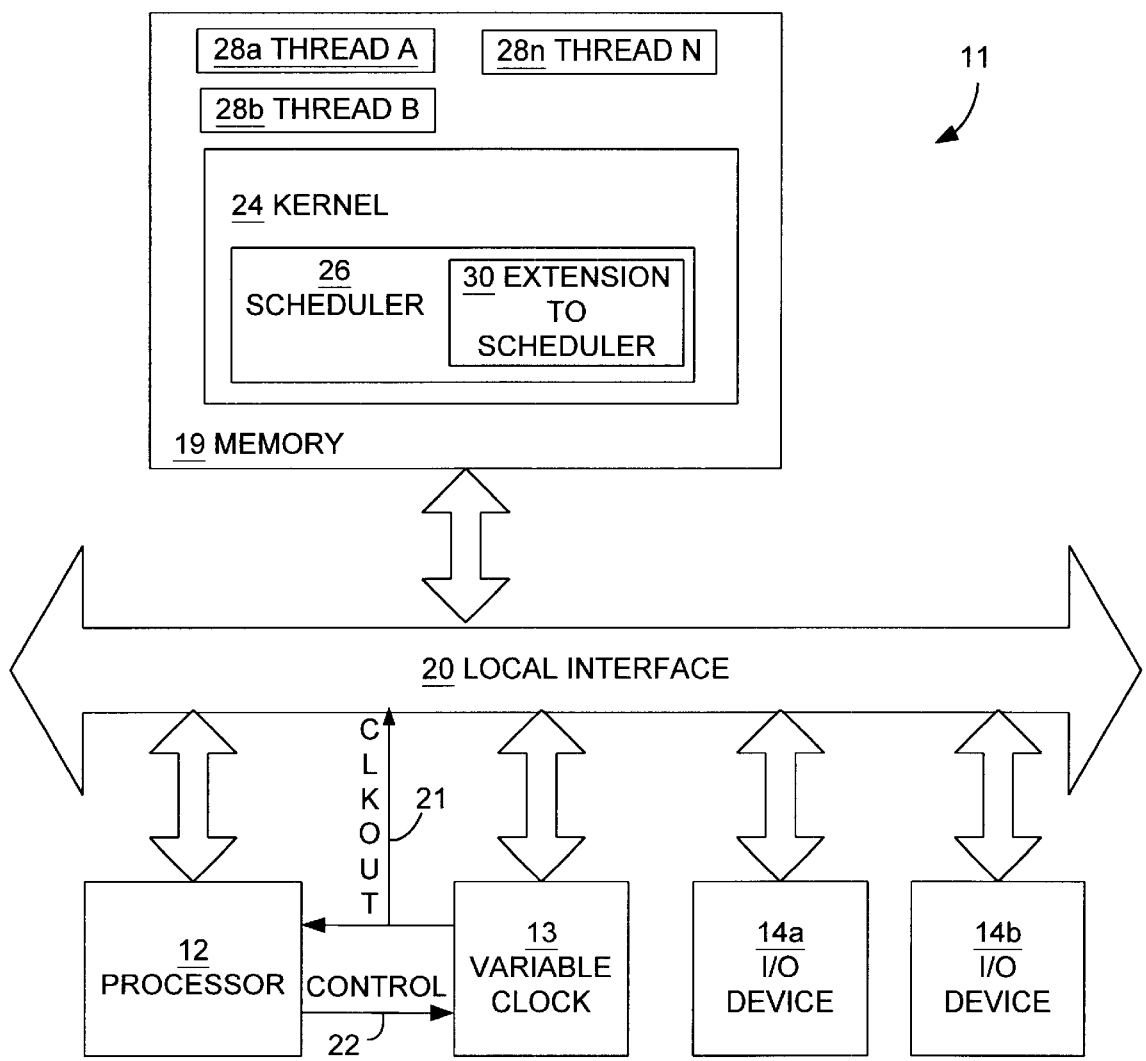
FIG. 1 is a block diagram illustrating an example embodiment of the apparatus for controlling processor clock rate on thread switch.

Certain objects, advantages, and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

A microprocessor-based system typically contains application-level software as well as an operating system, or kernel. The application-level software may be partitioned into threads. Threads can be used to perform multiple operations concurrently (e.g. monitoring for user input, receiving data and displaying data) while at the same time allowing the software which implements these multiple operations to be easier to understand, modify and debug, compared to an implementation without threads. Each thread comprises an ordered listing of executable instructions for implementing a logical function. For example, a function called Thread1( ) monitors for user input; Thread2( ) receives data; Thread3( ) displays data.

A system initialization routine registers each of these functions as a thread with the kernel. The scheduler portion of the kernel causes threads to alternately execute on the processor. In some implementations, called cooperative multitasking, the scheduler switches execution from one thread to another only when a thread voluntarily relinquishes control. In another implementation, called preemptive multitasking, the scheduler may switch from executing one thread to executing another after a specific amount of time (typically on the order of a few milliseconds) has elapsed.

Often the code implementing a thread is written to be unaware of other threads in the system. However, in a preemptive multitasking system, threads should be aware of each other when sharing the same resource. The kernel provides a mechanism called a semaphore which threads use to coordinate their use of the shared resource. The kernel may also provide other mechanisms that allow threads to communicate with each other.

Threads in a particular system usually have different processing requirements. In order for the system to operate properly, some threads should execute quickly, while other threads can execute at a slower speed without affecting system operation. For example, a thread which draws graphics on a display should execute at a higher speed than a thread which lights an LED when a user presses a button, because graphics is a processor-intensive operation, while an acceptable response time for a button push might be a second or two.

By using the preferred embodiment of this invention, a designer can choose a processor clock rate that is high enough to meet needed processing requirements, but the resulting system will use less power compared to prior systems because the clock runs at higher rates when that is necessary to meet processing requirements. The preferred embodiment of the present invention takes advantage of differences in thread processing requirements by running some threads at a high processor clock rate and other threads at a lower processor clock rate.

In some microprocessor-based systems, the system designer can associate a priority level with each thread. A thread with a higher priority level executes more often compared to one with a lower priority level. For example, in a system with only a high priority thread and a low priority thread, the high priority thread might execute during 80% of the CPU cycles. In a preferred embodiment of the invention, the processor clock rate at which a thread executes is tied to the thread priority level, such that assigning the highest priority level to a thread results in that thread executing at the highest supported processor clock rate. In other embodiments, processor clock rate and thread priority level are independent.

In accordance with a preferred embodiment of the present invention, a device for varying the speed of processor execution including a processor, a variable frequency clock, a local interface, and a memory is provided. Also provided is a method for varying the speed of processor execution, including steps of: associating a clock rate with each thread in a plurality of threads; scheduling a thread to be executed from the plurality of threads; setting the processor to execute at the clock frequency associated with the thread; and executing the thread on the processor at the clock rate associated with the thread.

Having summarized an embodiment of the invention above, reference is now made in detail to the description of the preferred embodiment of the invention as illustrated in the drawings. While the preferred embodiment of the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims. Indeed, the present invention is believed to be applicable to a variety of systems, devices, and technologies.

Turning now to the drawings, wherein like referenced numerals designate corresponding parts throughout the drawings, FIG. 1 shows the preferred embodiment of the invention in its typical environment. Generally, in terms of hardware architecture, as shown in FIG. 1, the computer 11 includes a processor 12, a variable frequency clock 13, one or more input and/or output (I/O) devices 14 (or peripherals), and memory 19, that are communicatively coupled via a local interface 20. The local interface 20 includes a clock signal 21, which is generated by the variable frequency clock 13. The clock signal 21 also connects to the processor 12. The processor 12 is capable of controlling the frequency of the variable frequency clock 13 through control signals 22. Note that control signals 22 perform the logical function of controlling the frequency of the variable frequency clock, but do not necessarily correspond to specific signals between the processor 12 and variable frequency clock 13. As one example, among others, this logical control function could instead be performed by the processor 12 reading from/writing to control registers within the variable frequency clock 13 circuitry.

The processor 12 is preferably a hardware device for executing software that can be stored in and executed from memory 19. The processor 12 can be any custom made or commercially available processor, a central processing unit (CPU), an auxiliary processor among several processors associated with the computer 11, a semiconductor based microprocessor (in the form of a microchip or chip set), a macroprocessor, or generally any device for executing software instructions.

The memory 19 can include, among others, any one or combination of volatile memory elements (e.g., random access memory (RAM, such as DRAM, SRAM, SDRAM, etc.)) and nonvolatile memory elements (e.g., flash, ROM, hard drive, tape, CDROM, etc.). Moreover, the memory 19 may incorporate electronic, magnetic, optical, and/or other types of storage media. Note that the memory 19 can have a distributed architecture, where various components are situated remote from one another, but can be accessed by the processor 12.

The software in memory 19 includes suitable kernel 24 which preferably provides file and data management, memory management, communication control and related services, and input-output control.

The kernel 24 also includes a scheduler 26 which causes threads 28 to be executed on the processor 12. In accordance with a preferred embodiment of the invention, the scheduler 26 is modified to also control the frequency of variable frequency clock 13 when switching execution from one thread 28 to another. The extension to scheduler 30 is a source program, executable program (object code), script, or any other entity comprising a set of instructions to be performed, or being capable of effecting at least the basic functions described herein to set clock rate when a thread switch occurs. When the form is a source program, then the program needs to be translated via a compiler, assembler, interpreter, or the like, which may or may not be included within the memory 19, so as to operate properly in connection with the kernel 24. Furthermore, the extension to scheduler 30 can be written in (a) an object oriented programming language, which has classes of data and methods, or (b) a procedural programming language, which has routines, subroutines, and/or functions, for example but not limited to, C, C++, Pascal, Basic, Perl, Java, and Ada.

The I/O devices 14 may include input devices, for example but not limited to, a keyboard, buttons or a remote control unit. Furthermore, the I/O devices 14 may also include output devices, for example but not limited to an LED display. The I/O devices 14 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

The local interface 20 can be, for example but not limited to, one or more buses or other wired or wireless connections, as is known in the art. The local interface 20 may have additional elements, which are omitted for simplicity, such as controllers, buffers (caches), drivers, repeaters, and receivers, to enable communications. Further, the local interface 20 may include address, control, and/or data connections to enable appropriate communications among the aforementioned components.

When the computer 11 is in operation, the processor 12 is configured to execute software stored within the memory 19, to communicate data to and from the memory 19, and to generally control operations of the computer 11 pursuant to the software. The kernel 24, the scheduler 26 and the extension to scheduler 30, in whole or in part, are read by the processor 12, perhaps buffered within the processor 12, and then executed.

When the extension to scheduler 30 is implemented in software, as is shown in FIG. 1, it should be noted that the extension to scheduler 30 can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The extension to scheduler 30 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the extension to scheduler 30 is implemented in hardware, the extension to scheduler 30 can implemented with, among others, any or a combination of the following technologies, which are each well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Figure 2:
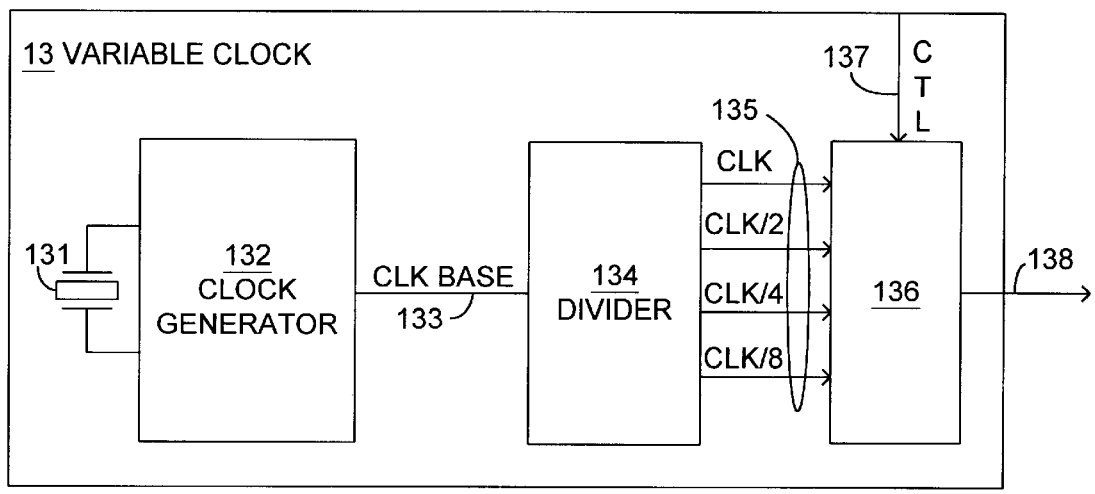
FIG. 2 is a block diagram illustrating a more detailed view of an example embodiment of the variable frequency clock depicted in FIG. 1.

FIG. 2 is a block diagram showing a more detailed view of the variable frequency clock 13 depicted in FIG. 1, in accordance with an example embodiment. A crystal 131 in combination with a clock generator 132 produces a base frequency clock signal 133. A divider 134 operates on the base frequency clock signal 133 to produce multiple clock signals 135 with frequencies equal to or lower than the base frequency, typically related to the base frequency by a power of two. In one embodiment, the divider 134 may produce outputs equal to the base frequency, one-half the base frequency, one-fourth the base frequency, and one-eighth the base frequency. The multiple clock signals 135 from the divider 134 feed into the multiplexer 136 as data inputs. The multiplexer 136 also has select inputs 137 for a clock control, which may be provided by the processor 12 or by other logic, such as that described in further detail in FIG. 4. The multiplexer 136 selects one of the multiple clock signals 135, based on the value of select inputs 137, and passes it through as output clock 138.

Figure 3:
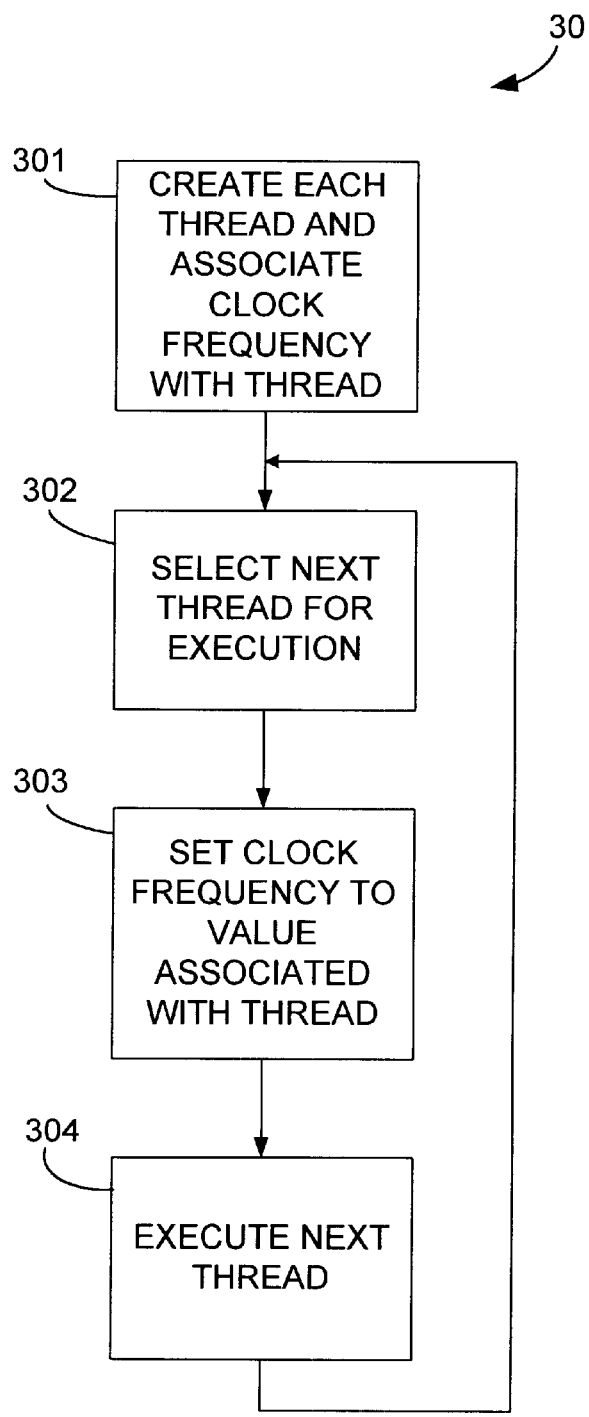
FIG. 3 is a flow chart describing an example embodiment of the method for controlling processor clock rate on thread switch.

FIG. 3 is a flowchart of an example embodiment, among others, of the extension to scheduler 30 method. In step 301, a process calls the kernel 24 (from FIG. 1) to create each thread 28 (from FIG. 1) and associate a clock rate with that thread. The meaning of the thread-clock rate association is that whenever a particular thread 28 is executed, the processor 12 (from FIG. 1) will operate at the clock rate associated with that particular thread 28. In one implementation, step 301 also associates a priority with each thread. Typically, step 301 will be performed during system initialization and the particular choice of clock rate and priority associated with each thread 28 is fixed by the system designer. However, alternative embodiments of the extension to scheduler 30 would allow a thread to be dynamically created and associated with a clock rate and priority, as well as have its clock rate or priority changed dynamically.

In step 302, the scheduler 26 selects a next thread to be executed. In one implementation, step 302 selects as the next thread to be executed that thread which is ready for execution and which has the highest priority. In step 303, the scheduler 26 calls the extension to scheduler 30 which sets the rate of the variable frequency clock 13 to the rate associated with the selected next thread. In step 304, the scheduler 26 executes the selected next thread. Steps 301 through 304 repeat as long as the system is running.

In the preferred embodiment, the associated clock rate is chosen from a set of discrete values, and the associated priority is chosen from a larger set of discrete values, such that each clock rate corresponds to a range of priorities. For example, priorities 1–10 (highest priorities) may correspond to the base clock frequency (highest clock rate), priorities 11–20 correspond to one-half the base clock frequency, priorities 21–30 correspond to one-fourth the base clock frequency, and priorities 31–40 correspond to one-eighth the base clock frequency. In an alternative embodiment, clock rate is independent of thread priority.

Figure 4:
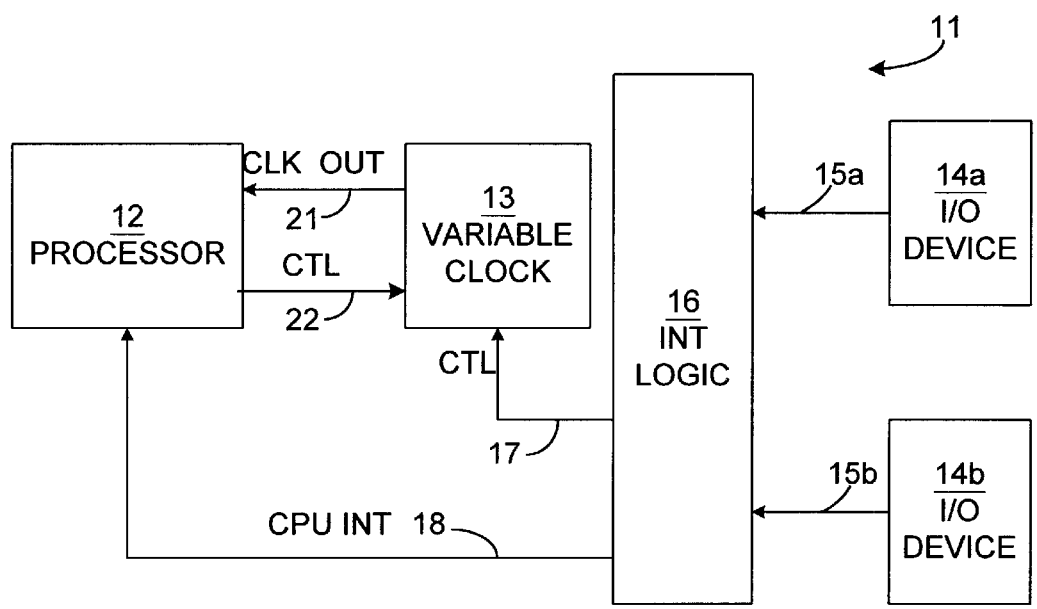
FIG. 4 is a block diagram illustrating an alternative embodiment of the apparatus for controlling processor clock rate on thread switch.

FIG. 4 is a block diagram showing computer system 11 with an alternative embodiment of the kernel extension to set clock rate on thread switch 30. I/O Devices 14 generate interrupt signals 15, which provide input to interrupt logic 16. When any one of the interrupt signals 15 is asserted, interrupt logic 16 asserts control signals 17, causing variable frequency clock 13 to output a clock signal 21, such that the clock signal is of the highest frequency supported by the variable frequency clock 13. The interrupt logic 16 also asserts an interrupt out signal 18 which interrupts the processor 12. Processor 12 can also control the frequency of variable frequency clock 13 through control signals 22. Note that control signals 22 perform a logical function of controlling the frequency of the variable frequency clock, but do not necessarily correspond to specific signals between the processor 12 and variable frequency clock 13. As an example, among others, this logical control function could instead be performed by the processor reading/writing to control registers within the variable frequency clock 13.

Figure 5:
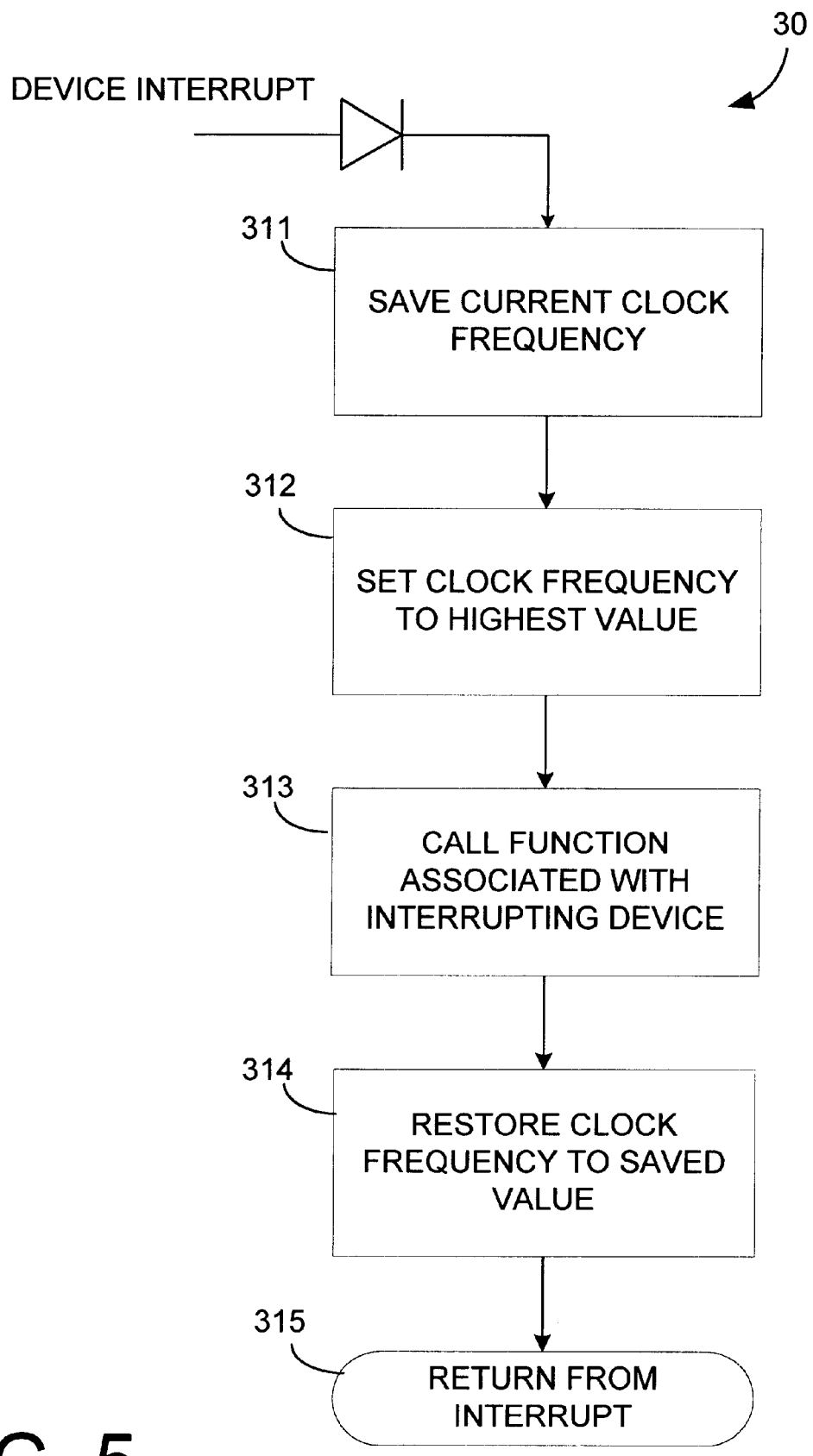
FIG. 5 is a flow chart describing an alternative embodiment of the method for controlling processor clock rate on thread switch.

FIG. 5 is a flow chart illustrating an alternative embodiment of the scheduler extension to set clock rate on thread switch 30. A device 14 (from FIG. 1) generates an interrupt to the processor 12 (from FIG. 1), and the interrupt service routine associated with the interrupting device begins executing immediately after the processor 12 finishes executing the current instruction. In step 311, the extension to scheduler 30 saves the current clock rate to memory 19 (from FIG. 1). In step 312, the interrupt service routine calls the extension to scheduler 30 which sets the rate of the variable frequency clock 13 (from FIG. 1) to its highest possible value. In step 313, the interrupt service routine, operating at the highest supported clock rate, calls a function associated with the particular device that caused the processor interrupt. Next, in step 314, the interrupt service routine calls the extension to scheduler 30 which sets the clock rate of the variable frequency clock 13 to the value saved in memory 19 during step 311. When the interrupt service routine returns in step 315, the processor 12 resumes execution at the instruction where previously interrupted, and is operating at the same clock rate as when previously interrupted.

It is emphasized that the above-described embodiments of the present invention, particularly any "preferred" embodiments, are merely possible examples of the implementations that are merely set forth for a clear understanding of the principles of the invention. It will be apparent to those skilled in the art that many modifications and variations may be made to the above-disclosed embodiments of the present invention without departing substantially from the spirit and principles of the invention. All such modifications and variations are intended to be included herein within the scope of the disclosure and present invention and protected by the following claims.

Therefore, having thus described the invention, at least the following is claimed:

1. A method for varying speed of processor execution, comprising:
   associating a clock rate with each thread in a plurality of threads;
   scheduling a thread to be executed from said plurality of threads;
   setting the processor to execute at said clock rate associated with said thread; and
   executing said thread on said processor at said clock rate associated with said thread.

2. The method of claim 1, further comprising
   associating a priority with each thread; and
   determining which of said threads scheduled for execution has a highest priority.

3. The method of claim 2, wherein the step of
   associating a priority with each of said plurality of threads allows the same priority to be assigned to multiple threads.

4. The method of claim 2, wherein the step of
   scheduling a thread to be executed includes scheduling the thread with said highest priority.

5. The method of claim 2, wherein said clock rate is chosen from a set of discrete values, said priority is chosen from a set of discrete values, and each clock rate corresponds to a range of priorities.

6. The method of claim 1, further comprising
   executing an interrupt service routine, such that start of said interrupt service routine sets said processor to execute at a highest clock rate, and end of said interrupt service routine sets said processor to execute at a clock rate used by a thread that was interrupted by said interrupt service routine.

7. A device for varying speed of processor execution, comprising:
   a variable frequency clock, wherein said variable frequency clock is capable of generating pulses of at least a highest frequency and a lowest frequency;
   a processor connected to said variable frequency clock, where said processor controls the frequency of said variable frequency clock;
   a memory configured to define a scheduler and a plurality of threads, where said scheduler selects a thread for execution and sets frequency of said variable frequency clock before executing said thread on said processor; and
   a local interface connecting said processor and said memory.

8. The device of claim 7, further comprising:
   interrupt logic comprising:
      a plurality of interrupt inputs; and
      logic configured to control said variable frequency clock such that said variable frequency clock outputs a clock signal at said highest clock frequency when any one of said plurality of interrupt inputs is asserted.

9. The device of claim 7, wherein said local interface uses said variable frequency clock to provide clocking signal to said memory.

10. The device of claim 7, wherein said variable frequency clock comprises:
    a clock generator capable of generating pulses of at least a highest frequency and a lowest frequency;
    a divider connected to said clock generator; and
    a multiplexer connected to said divider, where the output of said multiplexer provides the clock input to said processor, and said processor selects the output of said multiplexer.

11. A processor-based system comprising:
    a variable frequency clock, wherein said variable frequency clock is capable of generating pulses of at least a highest frequency and a lowest frequency;
    a processor connected to said variable frequency clock, where said processor controls the frequency of said variable frequency clock;

a memory configured to define a scheduler and a plurality of threads, where said scheduler selects a thread for execution and sets frequency of said variable frequency clock before executing said thread on said processor; and a local interface connecting said processor and said memory.

12. The system of claim 11, wherein the system is a set-top terminal for cable television.

13. The system of claim 11, wherein the system is a conditional access module used in conjunction with a set-top terminal for cable television.

* * * * *